(12) United States Patent
Schuh

(10) Patent No.: US 11,059,356 B2
(45) Date of Patent: Jul. 13, 2021

(54) REAR DOOR OF BODIES OF LORRIES OR LORRY TRAILERS

(71) Applicant: Rainer Karl Schuh, Wiener Neustadt (AT)

(72) Inventor: Rainer Karl Schuh, Wiener Neustadt (AT)

( * ) Notice: Subject to any disclaimer, the term of this patent is extended or adjusted under 35 U.S.C. 154(b) by 123 days.

(21) Appl. No.: 16/469,821

(22) PCT Filed: Dec. 22, 2016

(86) PCT No.: PCT/EP2016/082364
§ 371 (c)(1),
(2) Date: Jun. 14, 2019

(87) PCT Pub. No.: WO2018/113971
PCT Pub. Date: Jun. 28, 2018

(65) Prior Publication Data
US 2019/0315203 A1  Oct. 17, 2019

(51) Int. Cl.
*B60J 5/10* (2006.01)
(52) U.S. Cl.
CPC ..................... *B60J 5/108* (2013.01)
(58) Field of Classification Search
CPC ....................................................... B60J 15/108
See application file for complete search history.

(56) References Cited

U.S. PATENT DOCUMENTS

| 3,802,103 | A | 4/1974 | Neff |
| 2012/0303458 | A1 | 11/2012 | Schuler |

FOREIGN PATENT DOCUMENTS

| CA | 1155475 A | | 10/1983 | |
| DE | 10353885 A1 | | 6/2005 | |
| DE | 102011122299 A1 | * | 8/2012 | ........... B62D 35/001 |
| DE | 102011122299 A1 | | 8/2012 | |
| DE | 102013100215 A1 | * | 7/2014 | ............. B60J 5/108 |
| EP | 0042275 A1 | * | 12/1981 | ............. B60J 5/108 |
| FR | 2614851 A1 | * | 11/1988 | ........... B65D 90/008 |

* cited by examiner

*Primary Examiner* — Lori L Lyjak
(74) *Attorney, Agent, or Firm* — Lucas & Mercanti, LLP; Klaus P. Stoffel

(57) ABSTRACT

A rear door of bodies of lorries or lorry trailers, with at least one door leaf, which is hinged on the body to pivot about at least one vertical door axis provided in the corner region of the body. In order to mount accessories, advertising surfaces or lateral air deflectors, preferably in the region of the main closing edge of the door leaf, a supporting frame is hinged to pivot about a vertical frame axis, which supporting frame extends horizontally and substantially as far as the outer wall. In this lateral region, the supporting frame has a projection along at least part of its height, which projection engages in a groove-like recess congruent thereto on the body or on a component connected thereto, when the rear door is closed ready for travel.

8 Claims, 5 Drawing Sheets

REAR DOOR OF BODIES OF LORRIES OR LORRY TRAILERS

CROSS-REFERENCE TO RELATED APPLICATIONS

The present application is a 371 of International application PCT/EP2016/082364, filed Dec. 22, 2016, the priority of this application is hereby claimed and this application is incorporated herein by reference.

BACKGROUND OF THE INVENTION

The invention relates to a rear door of bodies of heavy goods vehicles or heavy goods vehicle trailers.

In the case of most heavy goods vehicle bodies or bodies of heavy goods vehicle trailers of all types, this distinction will hereinafter be made only where technically expedient, because these two objects do not differ from one another as far as the invention is concerned; a two-leaf door is provided, wherein each of the two door leafs can be turned from the closed position about one or two (double-joint hinge) vertical axles in the region of the vertical rear edge of the body through 270° until it at least substantially bears against the outer side of the longitudinal wall of the body, which permits the best possible access into the interior of the body. Here, in many cases, the two door leafs are fixed in their closed position by means of a so-called rotary bar locking means.

Such bodies and doors are extremely well proven, but nevertheless have inadequacies:

Firstly, the outer surfaces of such bodies constitute ideal advertising surfaces, and the side walls are, in this regard, already commonly utilized in their entirety by means of tensioned tarpaulins with corresponding print, but the rear surfaces of the door leafs, which are particularly relevant for following traffic, can in fact not be utilized owing to the hinges and fittings.

Secondly, during the operation of heavy goods vehicles, in particular when driving in cross-country traffic, a major air resistance which must be overcome and which therefore requires a large amount of fuel arises owing to the dead air behind the rear of the vehicle, and this dead air is dragged along like a sack. This effect is similar to the base drag in the case of projectiles, and is similarly impedimentary and unpleasant. Here, in order to reduce the fuel consumption, it has recently been permitted in many countries to provide guide vanes or the like at the vertical side edges of the body in the rear region, by means of which guide vanes this effect is reduced. These guide vanes which are arranged in the region of the joints of the rear door leafs now constitute a major obstruction to the mobility of the rear door leafs, and there is a major demand to eliminate this problem.

Thirdly, there is a demand to provide information items, warning notices, illumination devices, reversing lights, dirt collectors, cameras, proximity sensors, ladders and much more in any combination in the rear region of the body without the need for the corresponding alterations and fixtures to be made and provided on the body.

SUMMARY OF THE INVENTION

The invention has the aim of specifying a solution to these problems both individually and in combination.

The invention achieves this aim in that, on the door leafs, hereinafter only one will be referred to, at vertical joints or hinges which are preferably correspondingly provided in the region of the main closing edge of the door leaf, in the example shown in alignment with the vehicle central plane, there is articulated a supporting frame, the outline of which covers at least a part of the door leaf and which, in the region of the vertical rear corner edge of the body, is connectable or fixable to said body and/or to the door leaf. Furthermore, on the supporting frame, at its free vertical edge and over at least a part of its height, there is formed a projection which, in the closed, ready-for-driving state of the rear door, engages into a groove-like depression, congruent therewith, on the body or on a component connected to the latter.

This makes it possible that, during the course of the normal closing of the door, the supporting frame is connected fixedly to said door without the need for a dedicated specific action to be performed. This measure makes the supporting frame highly practicable for the first time, because in the high-stress delivery business, additionally required activities and handling operations face stubborn resistance from the users involved and lead to omissions and safety problems. The final closure and locking is realized by means of the routine rotary bar locking means, without additional components.

It is possible firstly for a guide vane to be provided on said frame in a fixedly fastened manner or so as to be rotatable relative to the supporting frame about at least one vertical axle and fixable, it is possible, independently of this, for a horizontal guide vane to be provided in the roof region, which horizontal guide vane diverts the clean air from the top downward, and it is possible, independently of this, for a tensioning frame for a tarpaulin, which possibly has information items or advertising printed thereon, to be fastened to the supporting frame, and it is also possible for a corresponding panel to be provided. It is also possible for articles such as information carriers of all types, warning notices, illumination devices, reversing lights, dirt collectors, cameras, proximity sensors, ladders, reversing cameras, warning lamps and the like to be fastened to the supporting frame.

The invention will be discussed and described in more detail below on the basis of the drawing, without being restricted thereto. Here,

DETAILED DESCRIPTION OF THE INVENTION

Figure 1:
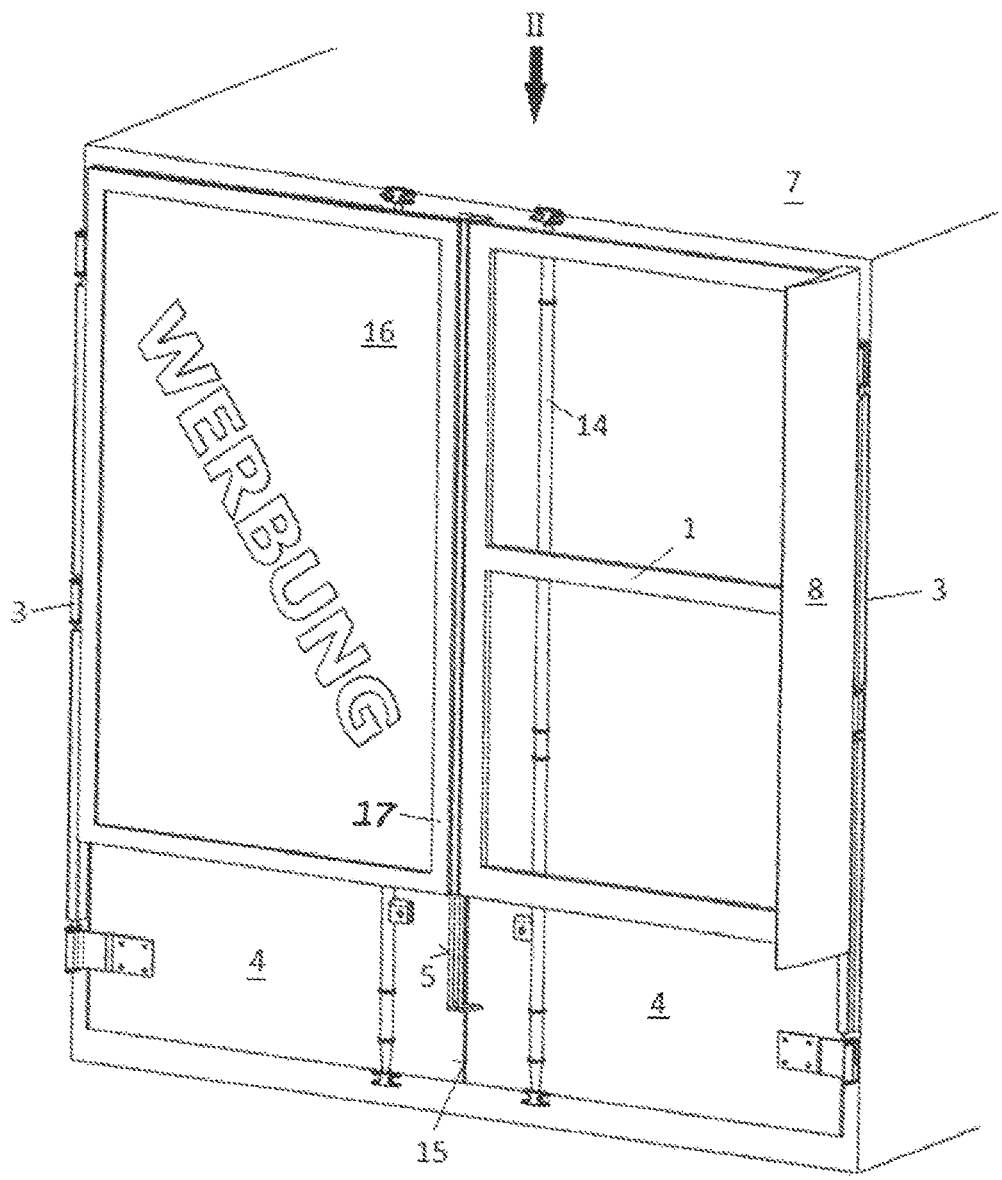
FIG. 1 shows a perspective view of a rear end designed according to the invention, with a tarpaulin on the left and with a guide vane on the right.

FIG. 1 shows a schematic rear view showing the overall construction of a door according to the invention: two door leafs 4 are articulated on a body 7 so as to be pivotable about associated door axles 3, which may also be double-joint hinges. Said door leafs 4 are held in the closed position thereof by means of fasteners, in most cases rotary bar locking means 14. According to the invention, vertically running frame axles 5 are preferably, as shown, arranged in the region of the main closing edges 15 of the two door leafs 4, in each case one supporting frame 1 being articulated so as to be pivotable about said frame axles.

Said supporting frames 1 may now bear a guide vane 8 for reducing rear drag, as in the case of the right-hand supporting frame in FIG. 1, or a tarpaulin 16, which is tensioned on its own tensioning frame 17 or on a tensioning frame integrated in the supporting frame 1, as in the case of the left-hand supporting frame. It is self-evidently also possible for the abovementioned accessories to be mounted on said supporting frame without the need for additional fittings or fixtures or the like to be installed.

As can be clearly seen from the illustration in FIG. 1, these two measures may be implemented independently of one another and therefore also in combination. The supporting frame 1 preferably does not cover the entire rear surface or door leaf surface, but rather extends to slightly above the fixtures of the closure means of the doors so as not to complicate the opening and closing thereof. The design and vertical extent of the guide vane 8 may be freely selected within wide limits.

Figure 2:
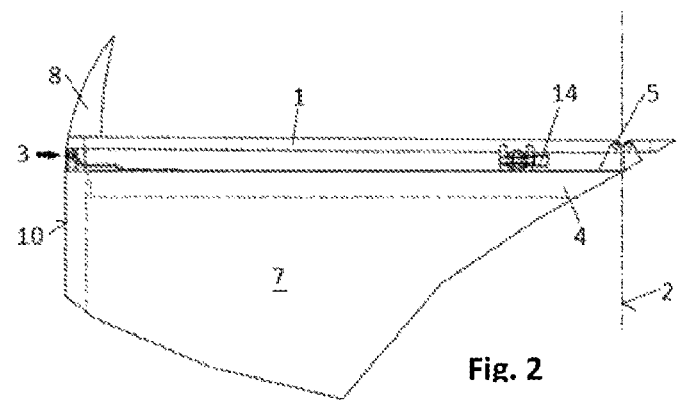
FIG. 2 shows a plan view of the right-hand corner region viewed in a direction of travel.

FIG. 2 shows a schematic view in the direction of the arrow II of FIG. 1: on a door leaf 4 which is fastened to the body 7 so as to be pivotable about the axle or double axle 3, in the region of the vertical vehicle central plane 2 which is shown by dash-dotted lines and which in this case coincides with the main closing edge of the door leaf 4, the supporting frame 1 is articulated so as to be pivotable about the vertical frame axle 5. The gap between door leaf 4 and supporting frame 1 can be clearly seen, along with the "accommodation" of the rotary bar locking means 14 which is thus made possible.

In the region of the vertical axle 3, that is to say in the region of the outer edge of the body 7, the guide vane 8 running in a vertical direction is provided on the supporting frame 1, which guide vane, in the operational position illustrated in FIGS. 1 and 2, directs air from the outer region of the vehicle toward the central plane 2 and thus reduces the detrimental base drag (in actual fact rear drag).

Figures 3, 4, 5:
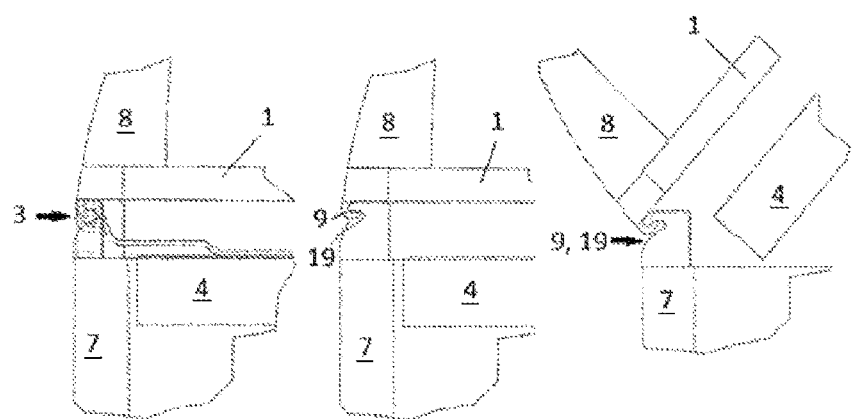
FIGS. 3 and 4 show two horizontal sections in said corner region on an enlarged scale.
FIG. 5 shows a schematic horizontal section in the case of a partially opened door.

FIGS. 3-4 illustrate two horizontal sections through the region of the axle 3 at different heights: FIG. 3 shows the hinge region in a preferred embodiment, and FIG. 4 shows a further region, from which the automatic locking between door leaf 4 and supporting frame 1, which relates to a preferred embodiment of the invention, can be seen: on the supporting frame 1, there is provided a projection 9 which, in the locking position, engages into a quasi-congruent (in the technical sense, not in the strictly mathematical sense), groove-like depression 19 on the body 7 or on a component fastened to the latter. Owing to the curved design of the two cooperating elements 9, 19, the supporting frame 1 is held in positively locking fashion without the need for the user to perform any active operations.

Figure 6:
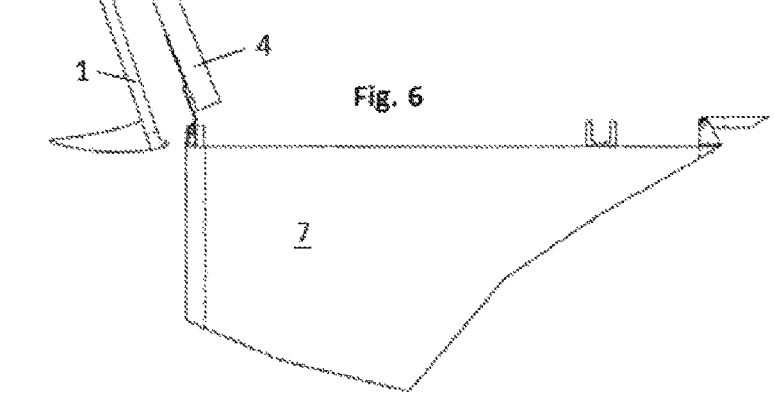
FIG. 6 shows a view as in FIG. 2 in the case of a door that has been opened further.
Figure 7:
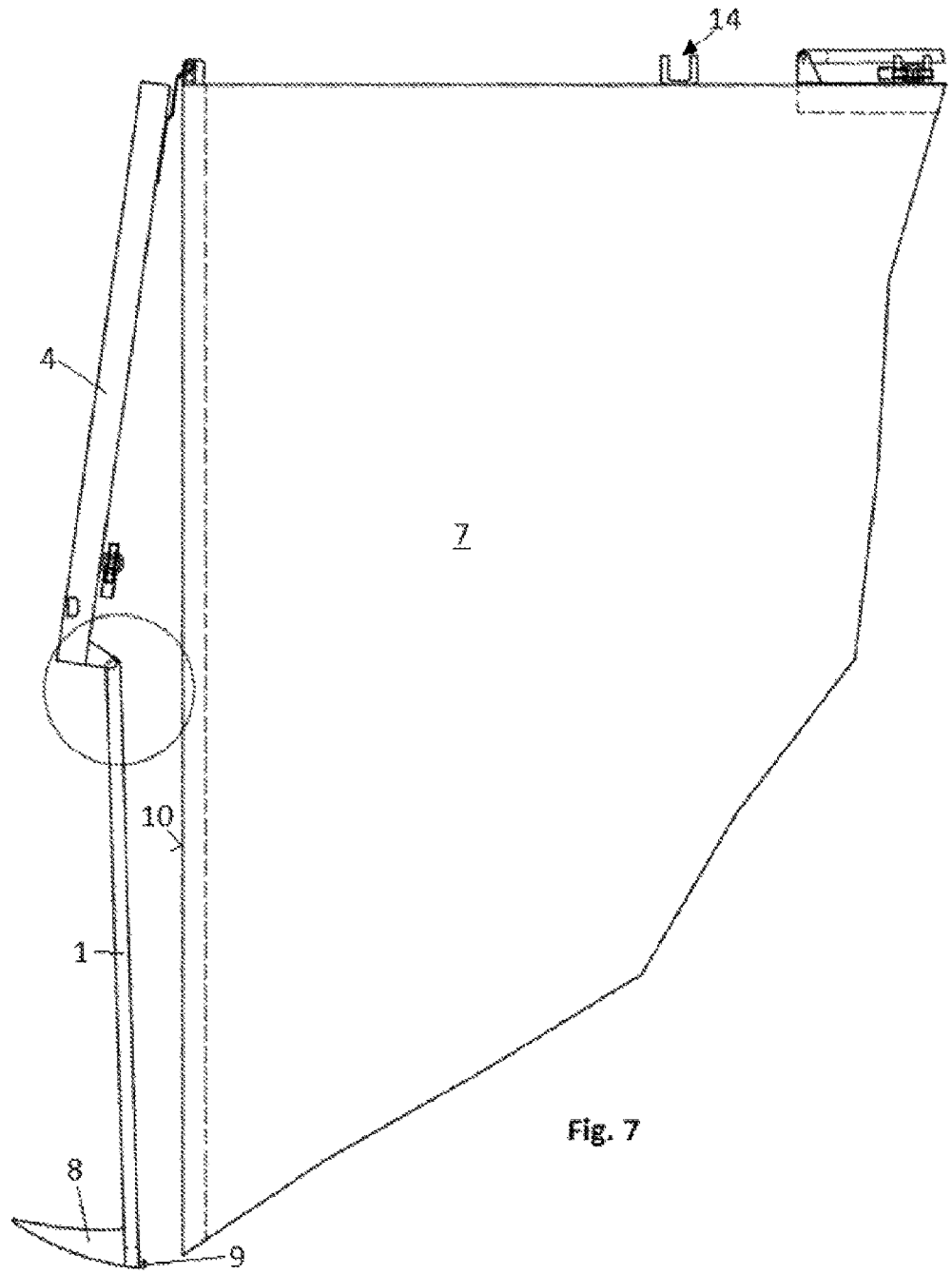
FIG. 7 shows a view as in FIG. 7 in the case of a fully opened door.

FIG. 5 shows how, during the opening of the door leaf 4 with the frame 1 about the axle 3, the two cooperating elements 9, 19 gradually disengage; FIG. 6 shows the final separation in this region, and FIG. 7 shows the end position along the lateral outer wall 10; the separation of the supporting frame from the door leaf thus occurs automatically during the opening of the doors, making the complete opening process easy and uncomplicated.

From FIGS. 3-5, it is also possible to clearly see the shape of the projection 9 and of the groove-like depression 19: the projection 9 is hook-shaped, and the "tip" of the hook is (in the operational position) directed toward the vehicle central plane. The groove is V-shaped and, owing to the mechanical stability and the relatively easy insertion of the projection, is asymmetrical, with the opening (in the operational position) directed away from the vehicle central plane and with the flank averted from the body 7 running approximately parallel to the door leaf plane.

In a manner not illustrated in the exemplary embodiment illustrated, stops may be provided between the frame 1 and the outer side of the door leaf 4, which stops serve for mechanical stabilization and for preventing rattling and vibration, in particular in the case of the variant with a tarpaulin, and which may also be omitted depending on the stability and the structure of the construction.

The form and installation and design of the guide vane 8 is likewise illustrated merely schematically, and it may be composed of a wide variety of materials and is therefore shown as a separate component, which need not be the case; under some circumstances, it may also be produced as a single piece with the supporting frame 1, it may be designed to vary over the height, or it may have interruptions or narrowed portions for fittings of any type, as indicated in FIG. 1.

As already mentioned, independently of this guide vane, a similarly designed guide vane may be arranged in a horizontal direction in the upper region of the supporting frame 1, which directs air from the region above the roof of the body downward and thus contributes to the reduction of the rear drag and to the cleaning of all coated surfaces.

The shape and the size of the projection 9 and therefore also of the groove 19 into which said projection engages into the position illustrated in FIG. 4 may be varied in a variety of ways, and it is also possible to dispense with the projection 9 in this form as long as the quasi-automatic fixing, which during the opening process requires a practical sequence of movements and effects the fixing automatically during the closing process, is realized, for example by means of the hook strip 12. What is possible in some cases, and advantageous under some circumstances, is an arrangement (not illustrated) of an elastically deformable groove in the region of the body 7, which is illustrated at the very bottom in FIG. 7, into which the projection 9 can be engaged with snap action in order to fix the door leaf in the open position.

The projection 9 may extend over the entire height of the body 7 or else may be formed only over partial sections of the height; this is dependent on the desired mechanical strength of the fixing and the available special conditions, because different fixtures permit or require different measures here.

Figure 8:
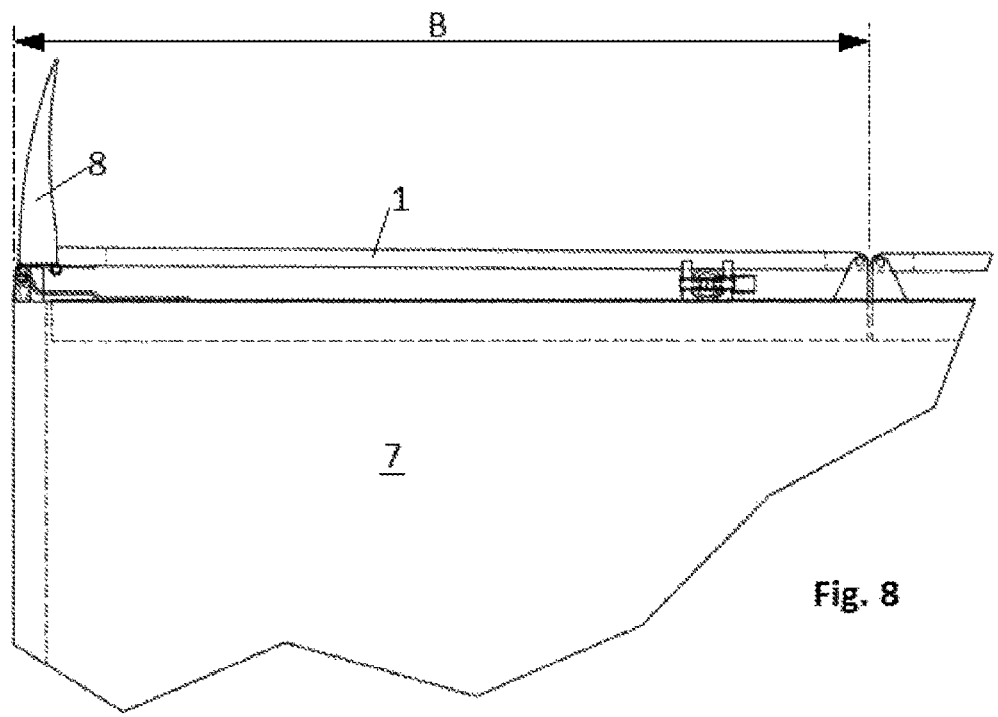
FIG. 8 shows a variant in a view similar to FIG. 2.
Figure 9:
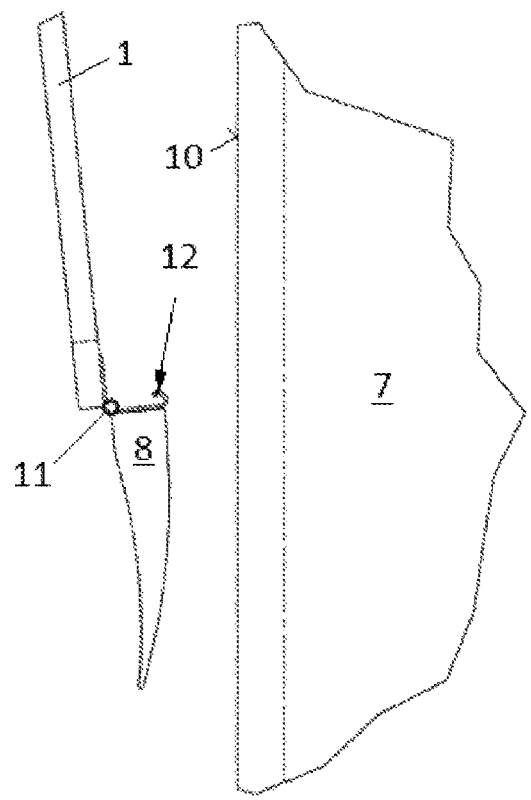
FIG. 9 shows the variant of FIG. 8 in a fully opened position.
Figure 10:
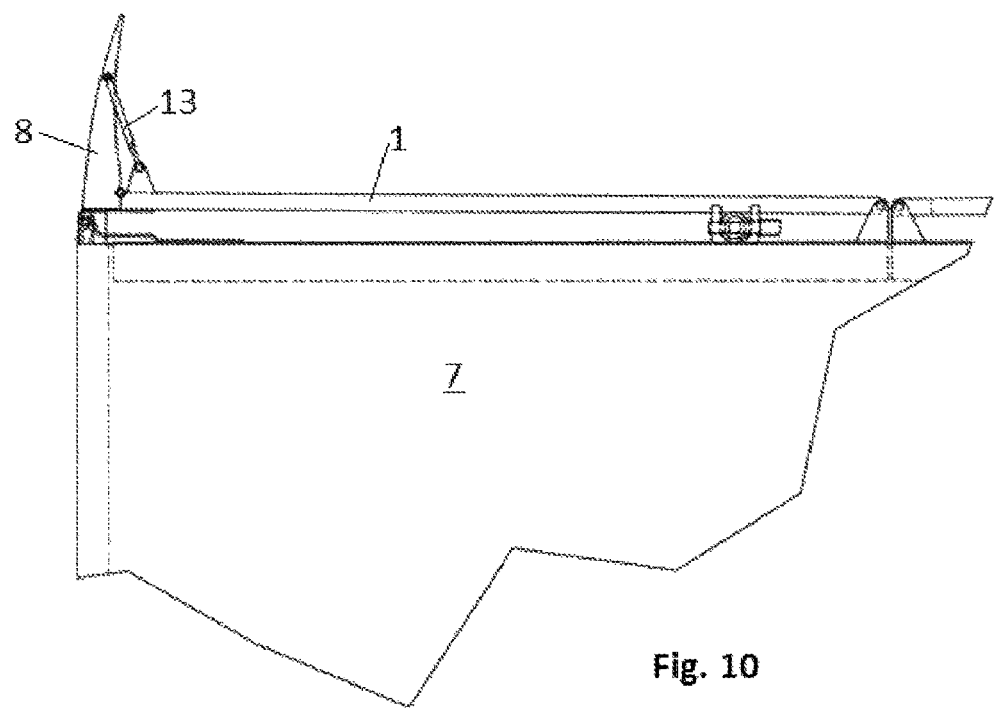
FIGS. 10-11 show a development of the variant in views similar to FIGS. 8-9.
Figure 11:
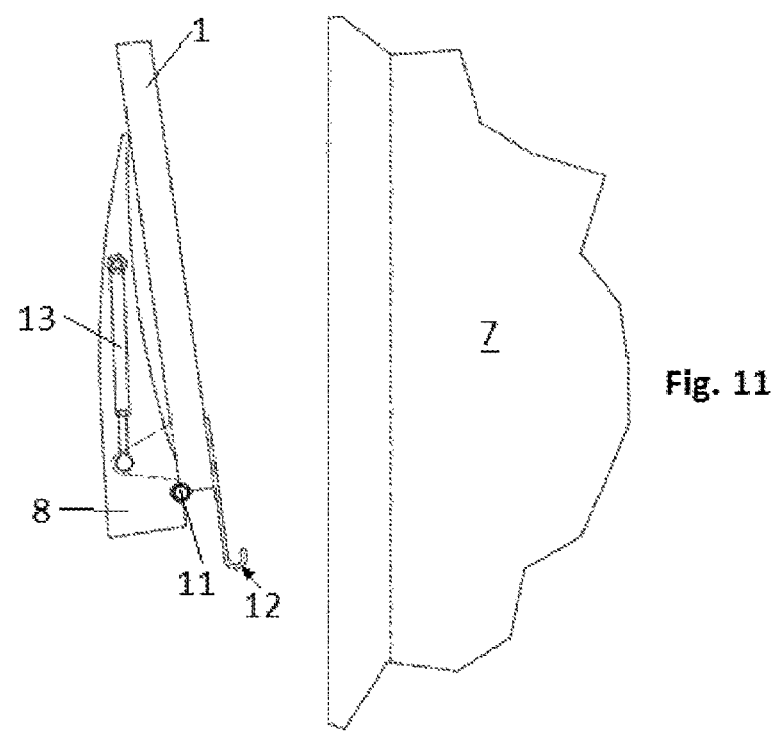

A variant of the embodiment as per FIGS. 1 to 7 is illustrated in FIGS. 8 and 9. Here, the guide vane 8 is mounted on the supporting frame 1 so as to be rotatable about a vane axle 11 and can thus, in the position illustrated in FIG. 9 when the doors are fully opened, be pivoted such that it does not project outward from the vehicle side wall 10. To nevertheless realize automatic mechanical fixing of the supporting frame 1 in the fully closed position, the projection 9 in the form of a hook strip 12 is formed on the vane 8, which projection always has the position illustrated in FIG. 9 in relation to the supporting frame 1, and, as can be seen from FIG. 6, engages into a recess (without reference designations) of the body 7, in the manner of the projection 9 into its counterpart groove 19. During operation, the guide vane 8 is held in its working position as a result of its end surface bearing against the corresponding frame region.

The embodiment as per figure is 10 and 11 has, as a special feature, that the guide vane 8 is actively, for example by means of a gas spring 13, held in non-positively locking stable fashion in one of two end positions during the rotation about its vane axle 11, in the manner of an over-center mechanism, and that said guide vane is not, as in the variant as per FIGS. 8 and 9, moved into a straightened-out position, but is rather pulled with its free edge against the door leaf. Here, too, a projection in the form of a hook strip 12 is provided which realizes the mechanical fixing in the operational position. Instead of the gas spring 13, a hydraulic or pneumatic piston-cylinder unit with the corresponding fluid lines and control elements may be provided for the active operation.

The supporting frame 1 preferably extends, as illustrated, in a horizontal direction from the main closing edge substantially to the lateral outer wall 10. Here, "substantially" means at least 80% and preferably at least 90% of the spacing B between the main closing edge and the lateral outer wall 10, as shown in FIG. 8.

In special cases, it is possible for the frame axle 5 to be relocated outward out of the region of the main closing edge, and for the horizontal extent of the supporting frame to be correspondingly reduced. Here, although the usability as an advertising carrier is reduced, the other fields of use remain unaffected. Here, a lower limit is to be regarded as a horizontal extent of 50% of the spacing B, because then the supporting frame will no longer pass the main closing edge during the opening process.

The invention is not restricted to the examples described and illustrated, but may be modified, varied and supplemented in a wide variety of ways.

As already stated, the illustration and description of stops, securing elements, locks, blocking means, locking means and the like has been omitted, because these are familiar to a person skilled in the art with knowledge of the invention and are clear in terms of their use and their construction. It is merely pointed out that, by way of example, as already mentioned, the rotary axles 3 and 5 may be formed in the manner of double joint hinges, and that such variants and equivalents are themselves familiar to a person skilled in the art and, with knowledge of the invention, may be easily used. The door leafs need not be of the same width; asymmetrical designs are known from the prior art, and the width of the supporting frame is then adapted to the respective door leaf width.

The projection 9 and its counterpart, the groove 19, may, within a certain scope, be provided at a different location than that illustrated; with the knowledge of the opening movement of the door leaf 4 and thus of the hinges used, and of the invention, a person skilled in the art can easily identify what geometrical ranges may be considered for these.

The final locking is, as mentioned in the introduction, realized as before, after the closing of the door, by means of the rotary bar locking means or other closing mechanisms known from the prior art. The construction according to the invention can be retroactively installed on virtually all known doors, and it may be prefabricated and distributed as a construction kit both for retroactive installation and for first-time fitting.

The materials that may be used are widely varied; it is not of importance whether the door leaf 4 is composed of a panel or of a thermally insulated panel, and the question of whether the supporting frame 1 has, on its outer side, a tensioning frame for a tarpaulin which may be used for advertising purposes or has an integrated tensioning frame of said type or has no such tensioning frame whatsoever has no influence on the essence of the invention and is therefore mentioned only briefly here. For the supporting frame 1, aluminum profiles are preferred, and metal-plastic composites are possible; this is dependent on the acting forces and thus also on the dimensions of the moving parts, and under some circumstances, use may also be made of steel profiles, composed in particular of rust-resistant steel. A form or covering with a panel is also possible.

The form of the joints or hinges or axle bearings for the various rotary axles discussed and described correspond substantially, in terms of their loading and dimensions, to the axles, bearings and joints already known in heavy goods vehicle engineering, and therefore also require no further explanation here.

The profile of all parts in this regard over the height may differ on a case-by-case basis; the guide vane may have recesses in order to provide space for holders, hinges, actuating elements, fasteners etc., or may be of multi-part design; all of these things have been omitted from the drawing or are illustrated merely schematically, because they do not affect the essence of the invention and can be easily provided and dimensioned by a person skilled in the art with knowledge of the invention.

| List of reference designations: | |
|---|---|
| 01 | Supporting frame |
| 02 | Central plane |
| 03 | Vertical door axle |
| 04 | Door leaf |
| 05 | Vertical frame axle |
| 06 | not used |
| 07 | Body |
| 08 | Guide vane |
| 09 | Projection |
| 10 | Lateral outer wall |
| 11 | Vane axle |
| 12 | Hook strip |
| 13 | Gas spring |
| 14 | Rotary bar locking means |
| 15 | Main closing edge |
| 16 | Tarpaulin |
| 17 | Tensioning Frame |
| 18 | not used |
| 19 | Groove-like depression |

The invention claimed is:

1. A rear door of a body of a heavy goods vehicle or heavy goods vehicle trailer, comprising: at least one door leaf articulated on the body so as to be pivotable about at least one vertical door axle provided in a corner region of the body; a supporting frame articulated to the door leaf so as to be pivotable about a vertical frame axle, wherein the supporting frame extends in a horizontal direction substantially as far as a lateral outer wall of the body; and a projection arranged in an outer lateral region of the frame so as to extent over at least a part of a height of the frame, wherein the projection, in a closed, ready-for-driving state of the rear door, engages into a groove-like depression, congruent with the projection, on the body or on a component connected to the body, wherein the groove-like depression is situated in a vicinity of the vertical door axle.

2. The rear door according to claim 1, wherein the supporting frame is articulated to a region of a main closing edge of the door leaf.

3. The rear door according to claim 1, wherein the supporting frame is equipped, in the region of the projection, with a vertically running guide vane and/or with a tensioning frame for a tarpaulin.

4. The rear door according to claim 3, wherein the guide vane is mounted so as to be pivotable relative to the supporting frame about a vertical vane axle.

5. The rear door according to claim 4, further comprising a gas pressure spring arranged to selectively hold the guide vane in one of two end positions of rotation about the vane axle.

6. The rear door according to claim 4, further comprising an actuating drive provided to adjust the guide vane about the vane axle.

7. The rear door according to claim 6, wherein the actuating drive is a hydraulic or pneumatic cylinder-piston unit.

8. The rear door according to claim 1, wherein the projection has a hook-shaped cross section and the groove has a V-shaped cross section.

* * * * *